UNITED STATES PATENT OFFICE.

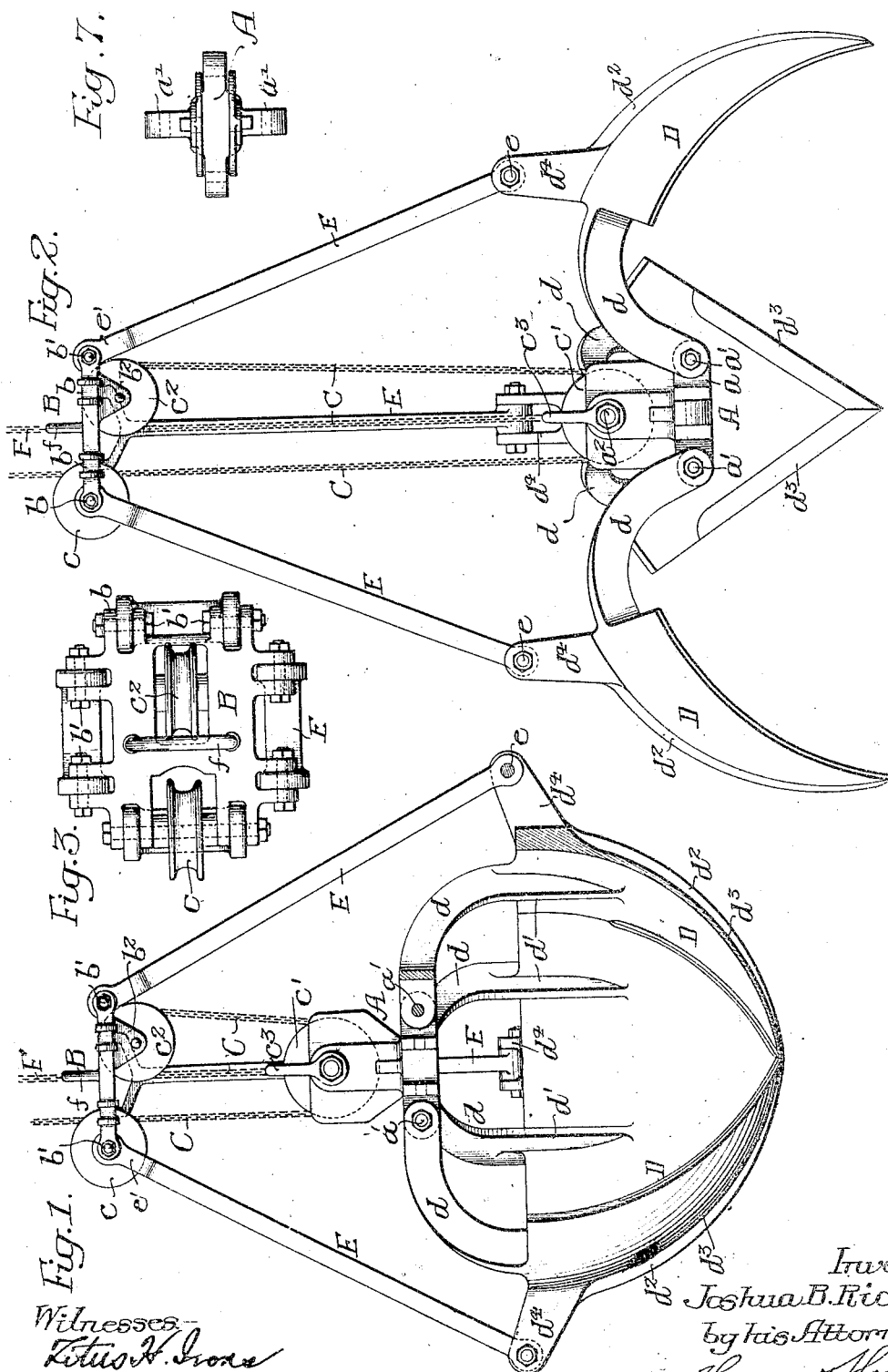

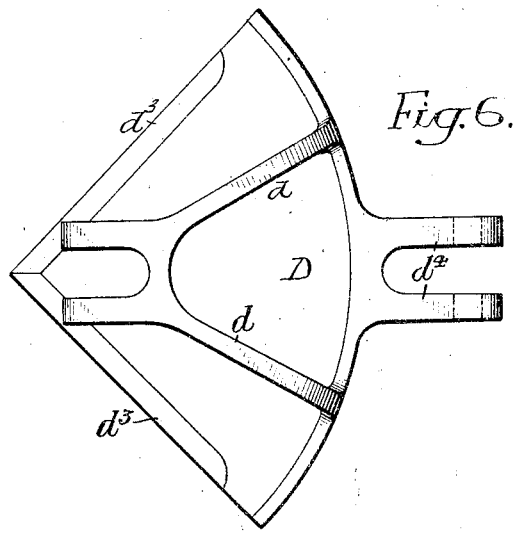
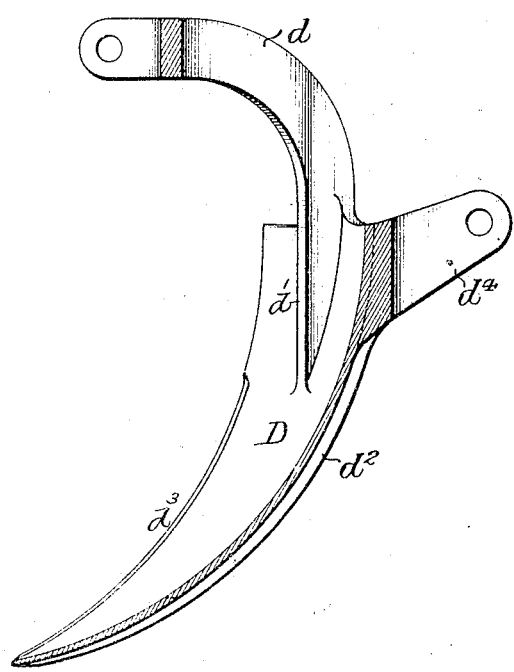
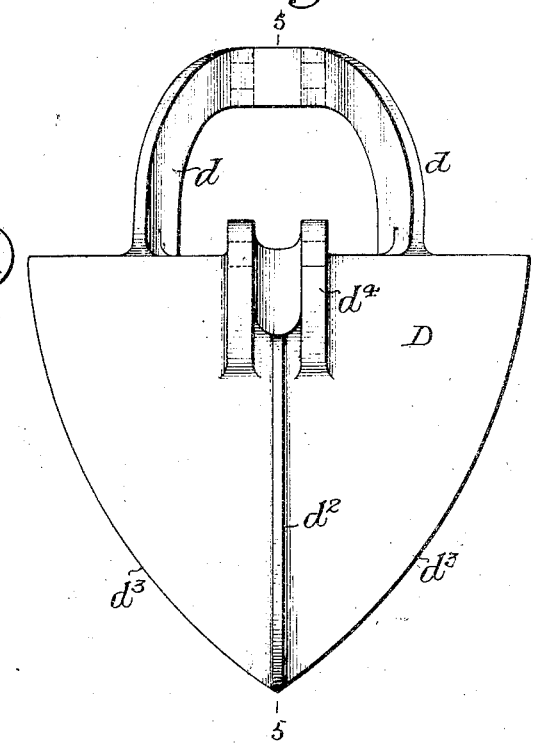

JOSHUA B. RICKARDS, OF PHILADELPHIA, PENNSYLVANIA.

DREDGING-BUCKET.

938,338.

Specification of Letters Patent.   Patented Oct. 26, 1909.

Application filed February 8, 1909. Serial No. 476,676.

*To all whom it may concern:*

Be it known that I, JOSHUA B. RICKARDS, a citizen of the United States, residing in Philadelphia, Pennsylvania, have invented certain Improvements in Dredging-Buckets, of which the following is a specification.

My invention relates to certain improvements in hoisting buckets of the type known as orange peel buckets. These buckets are usually provided with a series of tapered blades which, when closed, form the body of the bucket and when open form sharp prongs which enter the soil.

The object of my invention is to make a comparatively light and yet substantial bucket of this type and one which will carry more soil than those constructed in the ordinary manner. The main portions of the bucket are made of steel castings and consequently can be made much lighter than where portions of the bucket are made of sheet metal and heavy castings. This object I attain in the following manner, reference being had to the accompanying drawings, in which:—

Figure 1, is a view in elevation showing the bucket closed; one of the blades of the bucket being shown in section and another blade being removed; Fig. 2, is a view similar to Fig. 1, showing the bucket open with one of the blades removed; Fig. 3, is a plan view of the upper head of the bucket; Fig. 4, is a detached side view of one of the blades of the bucket; Fig. 5, is a sectional view on the line 5—5, Fig. 4; Fig. 6, is a plan view of one of the blades; and Fig. 7, is a plan view of the lower head of the bucket.

A is the lower head of the bucket; B is the upper head and D, D are the blades made tapered, as shown in Fig. 4. These blades have arms $d$ which are pivoted at $a'$ to brackets $a$ on the head A; these arms are cast integral with the blades D and extend a considerable distance above their upper edge when in the closed position, as illustrated in Fig. 1, so as to be above the level of the material in the bucket. The arms preferably extend down on the side of the blades and reinforce the body of each blade, as shown at $d'$, Fig. 1. Lugs $d^4$ project from the upper edge of each blade and a rib $d^2$ extends on the outside of the blade from the lugs to the point, as shown in Fig. 2, so as to reinforce the lower portion of the blade. The edges $d^3$ of the blade are beveled to form cutting edges. When the bucket is open, as shown in Fig. 2, and dropped onto the soil the blades cut into the soil a sufficient depth to allow the bucket to gather enough soil to fill it, that is, until the soil reaches almost to the underside of the arms $d$.

Extending from the lugs $d^4$ to the upper head B are links E. Pins $e$ connect these links with the lugs $d^4$ and the links are forked at the upper end and the arms $e'$ of the forks extend into slots $b$ on the head B and are secured to the head by pins $b'$. One of the pins $b'$ extends entirely through from one projection to another on the head B and carries the idler $c$ which guides the closing chain C. This closing chain passes around a grooved wheel $c'$ mounted on a pin $c^2$ carried by the head A and then passes up and around a wheel $c^2$ having its pivot pin mounted in lugs $b^2$ depending from the upper side of the head B. The chain C then passes down and is secured to an eye $c^3$ pivoted to the pin $a^2$ on the head A. The opening chain F is attached to an eye $f$ on the head B.

The arms and lugs are made integral with the blade D and the blade is made of cast steel. The links, as well as the two heads, are made of cast steel and consequently the bucket can be made very light and of large capacity, and the parts are of sufficient strength to withstand the rough usage to which a bucket of this type is subjected.

The operation of the bucket is as follows:— When the bucket is lowered it is in the position illustrated in Fig. 2, with the blades extended so as to allow the points to penetrate the soil by the weight of the bucket. This is done by loosening up on the closing chain and holding the bucket by the opening chain. When it is desired to close the bucket, power is applied to the closing chain C which raises the head and turns the points of the blades in, at the same time lifting the blades a certain distance until they are in the closed position, making a segmental bucket. The soil collected in the bucket piles up above the top of the bucket, but not sufficient to embed the arms $d$ and consequently when it is desired to discharge the bucket there is no tendency of the soil to adhere to the blades as the bucket will clear itself entirely of soil. This is a great improvement over buckets in which the head and arms are on a level with the top of the bucket, as the soil in buckets of this type, when of a sticky nature for instance, is apt to adhere tenaciously to the projecting portions and thus the bucket is not freely discharged of its contents.

The blades can be made as sharp as desired, and when the bucket is closed they make practically a tight receptacle for the soil. The parts can be readily repaired and renewed with comparatively little expense and loss of time.

I claim:—

1. The combination in a hoisting bucket of the orange peel type, of a series of curved tapered blades, said blades having upwardly projecting arms, the upper ends of the arms extending toward a central line drawn through the bucket, a head pivoted to the arms, said head and the inwardly extending portions of the arms being located above the load line of the bucket, lugs projecting from the upper edge of each blade, a second head, links connecting the said head with the lugs, and actuating means connected to the two heads for opening and closing the bucket.

2. The combination in a hoisting bucket of the orange peel type, of a series of tapered, curved blades having curved arms projecting from the upper edge of the blades and extending toward the center of the bucket, lugs projecting outwardly from the upper edge of each blade, an upper head and a lower head, the arms being pivoted to the lower head, links connecting the upper head with the lugs, a closing chain attached to the lower head, a wheel on the upper head around which the chain passes, and a wheel on the lower head around which the chain passes, with an opening chain attached to the upper head.

3. The combination in a hoisting bucket of the orange peel type having a series of tapered and curved blades, arms projecting from the upper edge of the blades and toward the center of the bucket, and means for opening and closing the bucket, said blades and arms being made integral.

4. The combination in a hoisting bucket of the orange peel type, of a series of tapered and curved blades, each blade having an integral arm projecting from its upper edge and curved inwardly, the arm extending on the inner side of the blade a given distance to form a strengthening rib, lugs on the back of the blade, a rib extending from the lugs to the point, said arms, lugs and ribs being made integral with the blade, and means connected with the several parts by which the blades are operated to open and close the bucket.

5. The combination in a hoisting bucket of the orange peel type, of a series of tapered and curved blades so shaped that when the bucket is closed the blades fit snugly against one another, each blade having an upwardly and inwardly extending arm and an outwardly extending lug on its upper edge, two heads, one mounted below the other, the arms of the blades being pivoted to the lower head, and links connecting the lugs to the upper head, the upper ends of the arms being forked so as to form a double bearing at the upper head to prevent the arms and the blades twisting.

6. The combination in a hoisting bucket of the orange peel type, of a series of tapered and curved blades made of cast steel and having integral arms extending upwardly and inwardly, and integral lugs extending outwardly from the upper edge thereof, each edge of the blade being beveled to form a cutting edge, upper and lower heads, the upper heads being pivoted to the arms, links connecting the upper head with the lugs on the blade, and means for opening and closing the bucket.

7. The combination in a hoisting bucket of the orange peel type, of four tapered and curved blades forming the bucket proper when closed, two arms projecting upwardly from each blade and extending inwardly, the arms of each blade being connected at their inner edges and extending on the inside of the blade to strengthen the same, a pair of lugs on the outside of the blade, said lugs on the outside of the blade being situated midway between the arms, a rib on the outside of the blade extending from the lugs to the point thereof, upper and lower heads, the lower head being shaped to receive the arms of each blade, pins connecting the head with the blades, links pivoted to the lugs and forked at their upper ends forming arms, pins connecting said arms with the upper head, with means for actuating the heads to open and close the bucket.

8. A blade for a hoisting bucket made in a single piece of cast steel and having a tapered and curved body portion beveled at the edges and having arms projecting upwardly and inwardly from its upper edge, two lugs projecting rearwardly, and a reinforcing rib on the outside of the blade extending from the lugs to the point.

In testimony whereof, I have signed my name to this specification, in the presence of two subscribing witnesses.

J H A B. RICKARDS.

Witnesses:
Wm. A. Barr,
Jos. H. Klein.